United States Patent Office 2,937,210
Patented May 17, 1960

2,937,210

PROCESS FOR PREPARING BROMOTRIFLUOROMETHANE

Rudolph Louis Pedrotti, Newark, Del., Frederic Wurl Swamer, Boothwyn, Pa., and Donald Clifford Dewey, Newark, Del., assignors to E. I. du Pont de Nemours and Company, Wilmington, Del., a corporation of Delaware No Drawing. Application October 17, 1958
Serial No. 767,796

9 Claims. (Cl. 260—653.8)

This invention relates to an improved process for preparing bromotrifluoromethane and more particularly to the preparation thereof by the reaction of bromine and trifluoromethane in the presence of a novel catalyst.

Bromotrifluoromethane is a known and valuable compound, being especially useful as a fire extinguishing agent. It is also useful as a refrigerant and as a low-boiling solvent. Various processes have been proposed for preparing bromotrifluoromethane. However, the best process known heretofore has been the thermal bromination of trifluoromethane in the absence of a catalyst, which process requires temperatures in excess of 500° C. in order to obtain practical conversions, temperatures below 500° C. producing very poor conversions. It has been further proposed to carry out such bromination in the presence of chlorine, which permits the use of lower temperatures in the range of 200–500° C. but which has the disadvantage of also producing material amounts of chlorinated products resulting in consumption of trifluoromethane starting material.

It is an object of this invention to provide a new and improved process for the preparation of bromotrifluoromethane which avoids the disadvantages of the prior processes. A particular object is to provide a process wherein bromine is reacted with trifluoromethane in the presence of a novel catalyst such that the reaction can be carried out at lower temperatures with the production of higher yields. Another object is to carry out the process in the presence of a specially activated or reactivated catalyst, and hence involves the process for preparing such catalyst. Still other objects will appear hereinafter.

The above and other objects may be accomplished in accord with this invention which comprises the process for preparing bromotrifluoromethane by contacting a gaseous mixture of bromine and trifluoromethane, which mixture contains from 0.2 to about 0.8 mole of bromine for each mole of trifluoromethane, with an activated chromium (III) oxide catalyst at a temperature of from about 400° C. to about 500° C. Preferably, the activated chromium (III) oxide catalyst employed is one that has been prepared by heating for at least 3 hours at a temperature of from about 400° C. to about 500° C. in an inert atmosphere a hydrated chromium (III) oxide or a used chromium (III) oxide catalyst of materially decreased activity, particularly where the inert atmosphere is steam.

By carrying out the reaction under the recited conditions in the presence of said catalyst, very high improved yields of bromotrifluoromethane of high purity are obtained together with high conversions of the bromine, i.e. yields of from about 82% to about 95% of bromotrifluoromethane based on the trifluoromethane, 90–95% under the preferred conditions, and an average bromine conversion of from about 50% to about 98%, 70–99% under the preferred conditions. The process has the advantage over the thermal process (no catalyst) of operation at lower temperatures at which the thermal process is very inefficient and impractical. At the same time, it avoids objectionable side reactions, such as the production of chlorinated products when the bromination is carried out in the presence of chlorine.

The process is very simply carried out by passing the mixture of vapors of bromine and trifluoromethane into contact with the catalyst in a heated reaction zone, preferably in a reactor tube. The reactor tube should be inert to bromine, preferably being constructed of Inconel or nickel. The effluent gases from the reactor tube are scrubbed with dilute caustic to remove HBr and then dried, for example, over drierite, calcium chloride, silica gel, or the like. Unreacted trifluoromethane can be separated from the bromotrifluoromethane by distillation and recycled to the process.

The original activated chromium (III) oxide catalyst usually is prepared by heating a hydrated chromium (III) oxide in an inert atmosphere at a temperature of from about 400° C. to about 700° C. for at least 3 hours up to about 25 hours or more, preferably at from about 400° C. to about 600° C. for from about 8 to about 16 hours. Temperatures materially above 700° C. are unnecessary and uneconomical. Inert atmospheres which are suitable are steam, nitrogen, argon, and carbon dioxide. Air or other active oxidizing atmospheres are not inert and are not suitable. For example, when it is attempted to activate the catalyst in the presence of atmospheric air, it has been observed that an inactive crystalline product results. Although the changes that take place during the activation are not fully understood, the active catalyst (prepared in an inert atmosphere) is amorphous in structure to X-ray diffraction analysis. Steam is particularly effective an an inert atmosphere, producing a catalyst having 50% greater activity than catalyst activated in other inert atmospheres. It has been determined experimentally that steam very effectively inhibits the growth of crystals which contribute to the permanent loss of activity of the catalyst.

Any hydrated chromium (III) oxide, i.e. any hydrate of $Cr_2O_3$, may be used. A representative suitable hydrated chromium (III) oxide is the readily available commercial Guignet's Green having the formula $$Cr_2O_3 \cdot 2H_2O$$ 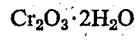

Suitable hydrated chromium (III) oxides may also be obtained by the hydrolysis of chromium (III) salts, such as the chlorides, bromides and nitrates in known manner, cf. "Treatise On Inorganic Chemistry," vol. II (1956), pp. 134–137, by Remy, published by Elsevier Publishing Co., Amsterdam. Usually, such chromium salts are hydrolyzed by treating them with an aqueous alkaline solution of a base such as ammonia, ammonium nitrite, zinc carbonate, zinc sulfide, sodium hydroxide and potassium hydroxide, preferably the less strongly alkaline solutions. For example, chromium (III) chloride may be treated with ammonia and washed with excess water to remove by-product $NH_4Cl$. The resulting hydrated chromium (III) oxide is dried at room temperature and then activated in the manner hereinbefore described to yield the active catalyst.

The chromium (III) fluoride, $CrF_3$, may be converted to the active catalyst directly by heating it at 400–500° C. in an atmosphere of steam.

A particularly important feature of the invention resides in reactivation (or regeneration) of spent catalyst, i.e. of catalyst which has been used in the production of bromotrifluoromethane in the process of this invention and which has been materially decreased in activity thereby. Such spent catalyst contains carbon and a bromide impurity and is not hydrated. Its reactivation may be accomplished by heating it at a temperature of from about 400° C. to about 500° C. in an atmosphere of air, oxygen or steam, but not in an atmosphere of nitrogen, argon or carbon dioxide. In such reactivation, an atmosphere of steam is greatly preferred as it produces a reactivated catalyst having an activity of up to about twice the activity of catalyst originally prepared from a hydrated chromium (III) oxide in an atmosphere of nitrogen and up to about 50% greater than that obtained by reactivation in air.

A preferred manner of conducting the process is to activate the catalyst in the form of 8–14 mesh granules at temperatures of about 50° C. to about 100° C. higher than that required for the bromination, cooling the catalyst to the required lower temperature for the bromination, and then bringing the gaseous mixture of bromine and trifluoromethane into contact with the catalyst. The bromination process may be desirably conducted at reaction temperatures ranging from about 400° C. to about 500° C. Below about 400° C., the conversion (percent bromine conversion) and productivity (lbs. of bromotrifluoromethane per hr. per cu. ft. of catalyst) decrease drastically, making that temperature the lower limit of practicality. Above about 500° C. decomposition of the desired product, bromotrifluoromethane, and unreacted trifluoromethane increase so that the yields fall off. The preferred temperature range is about 440–450° C.

The effect of the bromine to trifluoromethane molar ratio on conversion in the process is marked. Molar ratios in the range of 0.2 to about 0.8 are desired, and the process in that range behaves in the expected manner, that is, an increase in the ratio causes an almost directly proportional increase in conversion. Molar ratios materially greater than 0.8 affect the catalyst, resulting in lower conversions and decreased catalyst life. Below 0.2 molar ratio, the process becomes impractical because of the large amount of unreacted trifluoromethane which must be recycled. The preferred molar ratio is in the range of from about 0.5 to about 0.7 since such ratios are sufficiently below 0.8 to safeguard against catalyst degeneration and high enough so that the amount of recycle of unreacted trifluoromethane is not uneconomical.

Contact time is not a critical factor in this process but may range from 1 to 60 seconds. From the viewpoint of high productivity, preferred contact times are in the range 5–15 seconds.

In order to more clearly illustrate this invention, preferred modes of practicing it and the advantageous results to be obtained thereby, the following examples are given in which the proportions are by weight except where specifically indicated otherwise, and mass spectrometric analyses of the scrubbed product streams were used for calculation of the yields.

EXAMPLE 1

A 13/16 inch internal diameter Inconel reactor, which contained approximately 120 g. of 8–14 mesh Guignet's Green (hydrated chromium oxide) in a zone 18 inches long, was heated at 700° C. for 3 hours under a slow nitrogen sweep to effect catalyst activation. The reactor tube was cooled to 400° C. and a mixed stream of bromine and $CHF_3$ in a molar ratio of 0.65 was introduced by passing the $CHF_3$ at a feed rate of 13 g./hour through a reservoir of bromine heated to the appropriate temperature (34° C.) to develop the desired bromine vapor pressure. The product gases were passed through a caustic scrubbing train, a soda lime tower, a drierite tower, and finally into a sampling or collection system. The unreacted $CHF_3$ and bromine were not recycled, but this can readily be accomplished by employing a modification in the apparatus. The operation was conducted for 125 hours before the catalyst activity had dropped to about ½ the original value. The average bromine conversion was 90% and the yield based on $CHF_3$ was 95%.

EXAMPLE 2

To a 13/16 inch (I.D.) reactor was added 93 g. of 8–14 mesh Guignet's Green (hydrated chromium oxide) which formed a catalyst zone 13 inches in length. The catalyst was activated by heating it at 400° C.–500° C. under a slow stream of nitrogen for 16 hours. Trifluoromethane was fed at a rate of 30 g./hour, the bromine/$CHF_3$ molar ratio was 0.64 and reaction temperature of the catalyst bed was 450° C. The reaction was conducted for 70 hours. The conversion of bromine dropped from 98% to 75% as the catalyst lost activity and the yield based on $CHF_3$ varied from 85% to 94%.

In a similar experiment, the effect of temperature on the reaction was determined. At a temperature of 350° C. to 375° C., the conversion of bromine dropped to about 2%. At 500° C., the conversion of bromine is almost quantitative, but decomposition of $CHF_3$ and $CBrF_3$ increases so that the yield falls to about 80%.

EXAMPLE 3

In another experiment, various feed rates and bromine ratios were investigated. The reactor tube consisted of a 13/16 inch (I.D.) Inconel tube which contained 78 g. of hydrated chromium (III) oxide (Guignet's Green) catalyst, activated at 500° C. in a stream of nitrogen for 8 hours in a zone 12 inches in length. The volume of the catalyst zone was 92 ml. The temperature of the catalyst zone was 450° C. The results are given in Table I.

*Table 1*

| Bromine/$CHF_3$ Ratio | $CHF_3$ Feed, g./hr. | Superficial Contact Time (sec.) | Bromine Conversion, Percent | Yield, Percent |
| --- | --- | --- | --- | --- |
| 0.68 | 44 | 5.0 | 79 | 89 |
| 0.68 | 38 | 5.9 | 81 | |
| 0.68 | 23 | 9.7 | 90 | |
| 0.58 | 47 | 5.0 | 88 | 94 |
| 0.58 | 36 | 6.6 | 93 | |
| 0.58 | 24 | 9.7 | 95 | |
| 0.48 | 50 | 5.0 | 89 | |
| 0.48 | 33 | 7.6 | 92 | |
| 0.48 | 26 | 9.7 | 96 | 95 |

EXAMPLE 4

In order to determine the amount of $CBrF_3$ produced by the thermal reaction (in the absence of a catalyst) under equivalent conditions, a nickel reactor (9/16 inch I.D.) tube was used. The reaction zone was about 15 inches long. An equimolar mixture of $CHF_3$ and bromine was fed to the reactor. The product gases were scrubbed, dried and analyzed. The results are indicated in Table II.

*Table II*

| $CHF_3$, g./hr. | Temp. Reaction Zone (° C.) | Heat Transfer Medium | Mole Percent $CBrF_3$ in Product | Percent Br Conversion | Yield, Percent |
| --- | --- | --- | --- | --- | --- |
| 12 | 400 | None | Less than 1 | Less than 1.0 | 80 |
| 24 | 450 | do | 2 | 1 | 80 |
| 22 | 500 | do | 5 | 5 | 90 |
| 12 | 450 | Silica Granules. | 2 | 2 | 48 |

EXAMPLE 5

A 2 inch (I.D.) Inconel reactor which contained approximately 454 grams of 8–14 mesh Guignet's Green (hydrated chromium oxide) in a zone 12 inches long, was heated at 500° C. for 16 hours under a slow nitrogen sweep to effect catalyst activation. The reactor tube was then cooled to 450° C. and a bromine and $CHF_3$ mixture at a 0.7 molar ratio was passed through the catalyst for 40 hours at a rate of 275 grams $CHF_3$ per hour (6.8 sec. superficial contact time). The conversion of bromine went from a maximum of 78% down to 25% as the catalyst lost activity over the 40 hour run. A different lot of Guignet's Green catalyst was used for this example and for Example 6 than was used for Examples 1 through 3. It exhibited a lower half life under similar reaction conditions.

The reactor was then heated to 500° C. and swept with a low flow (5 grams/min.) of superheated steam for 24 hours. After reducing the reactor temperature to 450° C., the above reaction conditions were repeated. The steam regeneration was found to have increased the catalyst activity to the extent of doubling the original reaction rate constant. The conversion of bromine went from a maximum of 92% down to 50% as the catalyst lost activity over the 40 hour run. The yield based on $CHF_3$ went from 95% to 82% over this 40 hour period.

EXAMPLE 6

To a 2 inch (I.D.) Inconel reactor was added 454 grams of 8-14 mesh Guignet's Green (hydrated chromium oxide) catalyst in a zone 12 inches long. The catalyst was activated by heating at 500° C. under a low flow (5 grams/min.) of superheated steam for 22 hours. Trifluoromethane was fed at a rate of 275 grams per hour; the bromine/$CHF_3$ molar ratio was 0.69 and reaction temperature of the catalyst bed was 440° C. The reaction was conducted for 40 hours.

The steam activation was found to have increased the reaction velocity constant by 50% over that of similar catalyst activated with nitrogen at 500° C. The conversion of bromine went from a maximum of 92% down to 50% over the 40 hour period. The yield based on $CHF_3$ went from 93% to 83% over this 40 hour period.

It will be understood that the preceding examples are given for illustrative purposes solely and that this invention is not limited to the specific embodiments described therein. On the other hand, it will be apparent to those skilled in the art that many variations and modifications can be made in the conditions, catalysts and techniques employed, within the limits set forth in the general description, without departing from the spirit and scope of this invention.

From the preceding description, it will be apparent that this invention provides a new and improved catalytic process for preparing bromotrifluoromethane in high yields employing a novel catalyst, including a novel process for preparing and regenerating a catalyst which is exceptionally effective in said process for making bromotrifluoromethane. Accordingly, it is obvious that this invention constiutes a valuable advance in and contribution to the art.

The embodiments of the invention in which an exclusive property or privilege is claimed are defined as follows:

1. The process for preparing bromotrifluoromethane which comprises passing a gaseous mixture consisting essentially of bromine and trifluoromethane, which contains from 0.2 to about 0.8 mole of bromine for each mole of trifluoromethane, into contact with an activated chromium (III) oxide catalyst at a temperature of from about 400° C. to about 500° C.

2. The process for preparing bromotrifluoromethane which comprises passing a gaseous mixture consisting essentially of bromine and trifluoromethane, which contains from about 0.5 to about 0.7 mole of bromine for each mole of trifluoromethane, into contact with an activated chromium (III) oxide catalyst at a temperature of from about 400° C. to about 500° C.

3. The process for preparing bromotrifluoromethane which comprises activating a hydrated chromium (III) oxide by heating it for at least 3 hours at a temperature of from about 400° C. to about 700° C. in an atmosphere of the group consisting of steam, nitrogen, argon and carbon dioxide, and contacting said catalyst at a temperature of from about 400° C. to about 500° C. with a gaseous mixture consisting essentially of bromine and trifluoromethane in which the bromine is present in the ratio of from 0.2 to about 0.8 mole for each mole of trifluoromethane.

4. The process for preparing bromotrifluoromethane which comprises activating a hydrated chromium (III) oxide by heating it for at least 3 hours at a temperature of from about 400° C. to about 700° C. in an atmosphere of the group consisting of steam, nitrogen, argon and carbon dioxide, and contacting said catalyst at a temperature of from about 400° C. to about 500° C. with a gaseous mixture consisting essentially of bromine and trifluoromethane in which the bromine is present in the ratio of from about 0.5 to about 0.7 mole for each mole of trifluoromethane.

5. The process for preparing bromotrifluoromethane which comprises activating a hydrated chromium (III) oxide by heating it for from about 3 to about 24 hours at a temperature of from about 400° C. to about 700° C. in an atmosphere of steam, and contacting said catalyst at a temperature of from about 400° C. to about 500° C. with a gaseous mixture consisting essentially of bromine and trifluoromethane in which the bromine is present in the ratio of from 0.2 to about 0.8 mole for each mole of trifluoromethane.

6. The process for preparing bromotrifluoromethane which comprises activating a hydrated chromium (III) oxide by heating it for from about 8 to about 24 hours at a temperature of from about 500° C. to about 600° C. in an atomsphere of steam, and contacting said catalyst at a temperature of from about 400° C. to about 500° C. with a gaseous mixture consisting essentially of bromine and trifluoromethane in which the bromine is present in the ratio of from 0.2 to about 0.8 mole for each mole of trifluoromethane.

7. The process for preparing bromotrifluoromethane which comprises activating a hydrated chromium (III) oxide by heating it for from about 8 to about 24 hours at a temperature of from about 500° C. to about 600° C. in an atmosphere of steam, and contacting said catalyst at a temperature of from about 400° C. to about 500° C. with a gaseous mixture consisting essentially of bromine and trifluoromethane in which the bromine is present in the ratio of from about 0.5 to about 0.7 mole for each mole of trifluoromethane.

8. In the process for preparing bromotrifluoromethane wherein a gaseous mixture consisting essentially of bromine and trifluoromethane is reacted in the presence of an activated chromium (III) oxide catalyst, the step of reactivating siad catalyst after its activity has materially decreased which comprises heating the catalyst for from about 3 to about 24 hours at a temperature of from about 400° C. to about 700° C. in an atmosphere of steam.

9. In the process for preparing bromotrifluoromethane wherein a gaseous mixture consisting essentially of bromine and trifluoromethane is reacted in the presence of an activated chromium (III) oxide catalyst, the step of reactivating said catalyst after its activity has materially decreased which comprises heating the catalyst for from about 8 to about 24 hours at a temperature of from about 500° C. to about 600° C. in an atmosphere of steam.

References Cited in the file of this patent

UNITED STATES PATENTS 2,871,274    Ruh et al. _____ Jan. 27, 1959